US006275793B1

(12) United States Patent
Tavernese

(10) Patent No.: US 6,275,793 B1
(45) Date of Patent: Aug. 14, 2001

(54) SPEECH PLAYBACK WITH PREBUFFERED OPENINGS

(75) Inventor: Peter Tavernese, Kings Park, NY (US)

(73) Assignee: Periphonics Corporation, Bohemia, NY (US)

( * ) Notice: Subject to any disclaimer, the term of this patent is extended or adjusted under 35 U.S.C. 154(b) by 0 days.

(21) Appl. No.: 09/301,007

(22) Filed: Apr. 28, 1999

(51) Int. Cl.[7] .............................. G11B 20/10; G01L 13/02

(52) U.S. Cl. .......................... 704/201; 704/500; 379/67.1; 379/70

(58) Field of Search ..................................... 704/201, 500; 379/68, 67.1, 72, 70

(56) References Cited

U.S. PATENT DOCUMENTS 4,320,256 * 3/1982 Freeman ................................. 379/73
4,420,656 * 12/1983 Freeman ................................. 379/73
4,813,014 * 3/1989 DeBell ................................... 365/45
5,454,036 * 9/1995 Gleeman et al. .................... 379/392
5,822,537 * 10/1998 Katseff et al. ....................... 709/231
5,841,979 * 11/1998 Schulhof et al. .

* cited by examiner

*Primary Examiner*—William Korzuch
*Assistant Examiner*—Daniel Abebe
(74) *Attorney, Agent, or Firm*—Kenneth P. Robinson

(57) ABSTRACT

Playback of pre-recorded messages to respond to caller inquiries has been subject to delays inherent in speech retrieval. Latent periods, both initial and intra-message, are reduced by breaking speech elements (words, phrases, sentences, etc.) into opening fragments and remaining portions. For each pre-recorded speech element for a particular application, an opening fragment (e.g., 4K bytes of speech data) is stored in active computer memory. The remaining portion of each speech element, regardless of length, is stored in a large capacity speech storage facility. For an incoming call, an appropriate responsive message is determined. The opening fragment of a pre-recorded speech element for that message is retrieved from active memory and used to initiate message transmission to the caller. Contemporaneously, a remaining portion of the speech element is retrieved from the storage facility and moved to active memory. By concatenation techniques, the remaining portion is transmitted to provide continuous speech to the caller.

17 Claims, 3 Drawing Sheets

SPEECH PLAYBACK WITH PREBUFFERED OPENINGS

RELATED APPLICATIONS (Not Applicable)

FEDERALLY SPONSORED RESEARCH (Not Applicable)

BACKGROUND OF THE INVENTION

This invention relates to speech playback systems and, more particularly, such systems with reduced latent periods prior to and during playback of pre-recorded speech.

Speech playback systems of different types are available for a variety of applications. The design, operation and capabilities of such systems are well known to skilled persons. A typical application involves informational responses to inquiries provided by callers using an "800" type telephone service.

The responses to callers provided by many such systems are subject to delays or latent periods prior to and during playback of recorded messages. Playback systems may typically have a capacity to store and play thousands of recorded messages (e.g., opening messages and responses to caller's inquiries). Such capacity may represent thousands of hours of recorded speech. Speech (e.g., in digital format) may be stored in active solid state memory directly associated with a computer. However, at the present state of the art use of such memory is subject to limitations in capacity and economic tradeoffs. Based on both technical and economic considerations it is typically not practical to provide adequate speech storage capacity in active computer memory. As a result, a separate or associated speech storage facility is relied upon in order to provide adequate speech storage capacity. Such a facility may utilize large capacity electromagnetic or other storage units to which access is provided by a speech data server unit which may be linked to other units of the playback system by a local area network or other communication channel.

Systems of the type described provide adequate capabilities and capacity for speech storage and retrieval. However, the need to retrieve recorded messages from a speech storage facility introduces delays and latent periods prior to and during speech playback. Such delays in initial response and latent periods (e.g., "dead air" gaps) between message portions result from the response times and signal transmission delays inherent in speech retrieval from a typical speech storage facility.

Objects of the present invention are, therefore, to provide new and improved speech playback systems and methods, and such systems and methods having one or more of the following advantages and characteristics:

rapid opening speech playback response;

reduced latent periods during speech playback;

limitation of active computer memory capacity requirements;

improved flow of speech during concatenation; and economical high-capacity speech storage with rapid opening of speech response.

SUMMARY OF THE INVENTION

In accordance with the invention, a speech playback system, using concatenation with rapid opening to respond to an incoming call from a caller, includes memory to store opening fragments of speech elements and permit rapid retrieval access thereto, and storage to store remaining portions of speech elements and permit retrieval access thereto which is slower than such rapid retrieval access. The system also includes a controller responsive to the incoming call (i) to determine a responsive message, (ii) to cause an opening fragment of a speech element to be retrieved from memory, (iii) to cause a remaining portion of that speech element to be retrieved from storage, and (iv) to cause a message beginning with the opening fragment and continuing with the remaining portion to be provided to the caller.

Typically, the speech playback system will also include a speech playback unit to convert retrieved speech elements into audio signals, the memory may be a solid state computer memory, and a storage facility may include an electromagnetic medium speech storage unit controlled by a speech data server.

Also in accordance with the invention, a speech playback method, using concatenation with rapid opening to respond to an incoming call from a caller, includes the steps of:

(a) storing opening fragments of speech elements to permit rapid retrieval access thereto;

(b) storing remaining portions of speech elements to permit retrieval access thereto which is slower than such rapid retrieval access;

(c) determining a responsive message in response to the incoming call;

(d) retrieving an opening fragment stored in step (a);

(e) initiating action to transmit to the caller a message beginning with the opening fragment retrieved in step (d);

(f) retrieving a remaining portion stored in step (b); and (g) continuing transmission to the caller of the message initiated in step (e) by transmission of the remaining portion retrieved in step (f).

For a better understanding of the invention, together with other and further objects, reference is made to the accompanying drawings and the scope of the invention will be pointed out in the accompanying claims.

DESCRIPTION OF THE INVENTION

Figure 1:
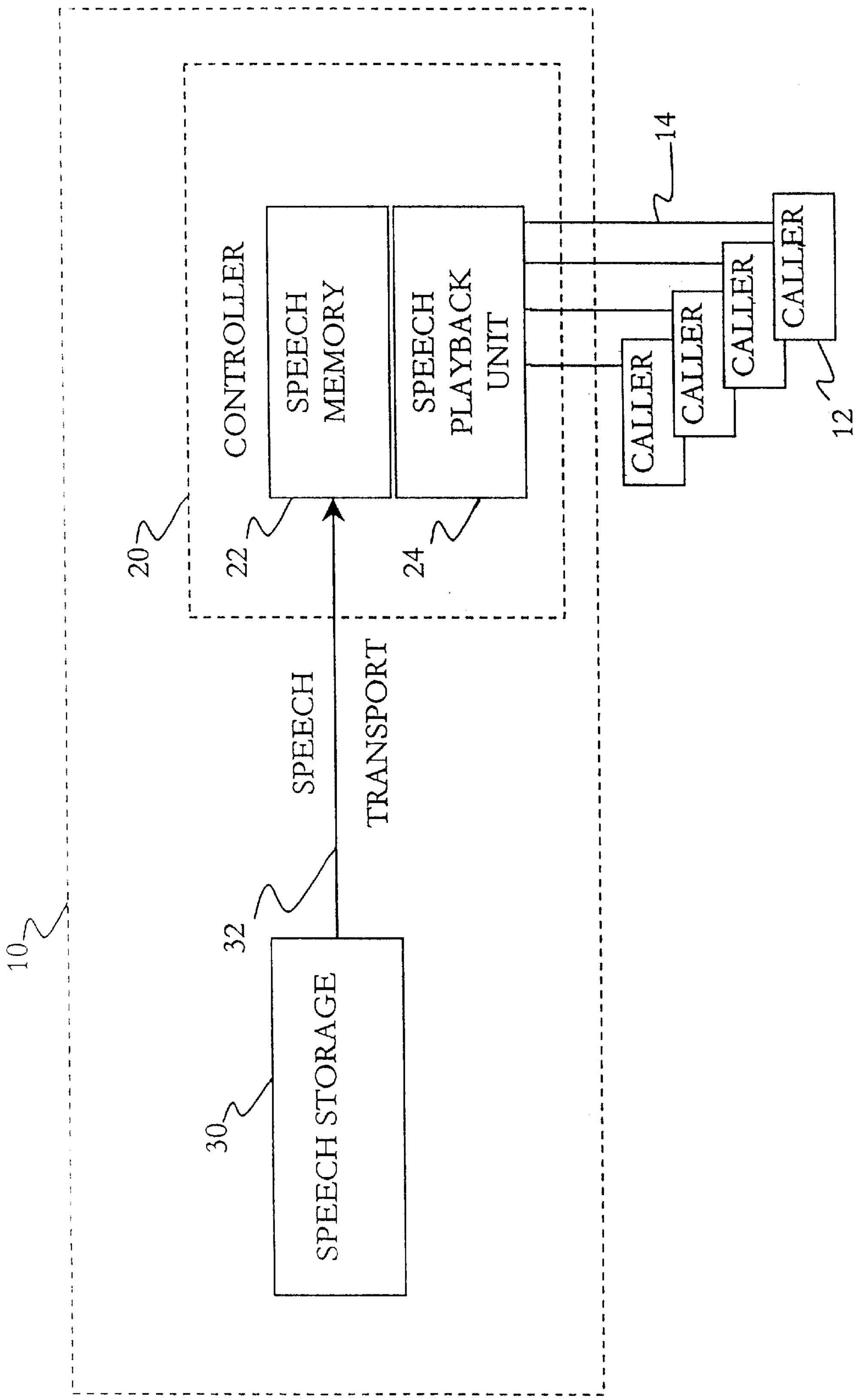
FIG. 1 is a block diagram of a speech playback system in accordance with the invention.

FIG. 1 illustrates an embodiment of a speech playback system 10 utilizing the invention. As shown, system 10 is arranged to receive calls from an individual caller via unit 12, which may be a telephone instrument, for example. Communication path 14 shown linking unit 12 and system 10 may comprise a public telephone network or other suitable communication facility enabling two-way communication. As represented in FIG. 1, the system will typically be configured to serve a plurality of callers initiating individual calls.

As shown, system 10 includes a controller 20, which may be a suitable microprocessor-based or other computer facility utilizing suitable computer programs, a memory shown as speech memory 22, and a speech playback unit 24.

Memory 22, which may comprise of the order of 4 megabytes of active solid state computer memory or other suitable rapid access storage capacity, is shown as positioned internal to controller 20, however other configurations may be employed. Speech playback unit 24, also shown internal to controller 24 for purposes of example, comprises a suitable unit or capability enabling digital or other signals representative of retrieved speech to be constituted as audio signals appropriate for playback to a caller. The FIG. 1 speech playback system, as shown, also includes speech storage and speech transport facilities 30 and 32, respectively. Speech storage unit 30 may comprise a high capacity electromagnetic medium or other suitable data storage device or multi-unit configuration arranged for storage and retrieval of speech elements. For present purposes a "speech element" is defined as a speech portion of any length as appropriate for use in an application (e.g., a single digit number, a word, a sentence, a paragraph, or any shorter or longer portion of speech). Speech transport 32 may comprise any suitable form of link or path (e.g., a conductor, bus, local area network, etc.) enabling signal transmission between speech storage unit 30 and other portions of the system.

As will be further described, in this embodiment controller 20 is responsive to an incoming call and arranged:

(i) to determine an appropriate message responsive to the incoming call from caller 12;

(ii) to cause an opening fragment of a speech element (e.g., the first 4 kilobytes) to be retrieved from memory 22;

(iii) to cause a remaining portion (e.g., the remainder, if any) of that speech element to be retrieved from speech storage 30; and (iv) to cause a message beginning with the retrieved opening fragment and continuing with the retrieved remaining portion to be sent to caller 12 (e.g., via playback unit 24).

As will now be appreciated, use of the invention reduces the time required to initiate the playback of the responsive message to the caller. The playback of a message comprising a speech element pre-stored in storage 30 would entail a finite delay while such speech element was retrieved. However, with the opening fragment more rapidly retrieved from active computer memory 22, message playback to the caller is enabled to begin more quickly. Then while the opening fragment is being provided to the caller, the remaining portion of the speech element is moved from storage 30 to memory 22 in time to provide a continuous playback of the complete speech element, or a close approximation of continuous playback, to the callers. At the present state of the development and use of speech playback equipment, it will be apparent that once having an understanding of the invention skilled persons will be capable of implementing the components of the FIG. 1 system, including other and alternative features and capabilities already known for use in such systems.

As discussed above, in a currently preferred configuration the opening fragments stored in memory 22 consist of a fixed portion of each pre-recorded speech element. Thus, for a given application a speech playback system may be supplied with thousands of pre-recorded speech elements. Some elements may be single numerical digits which may by concatenation techniques be assembled into multi-digit numerical responses. Other speech elements may be complete sentences, each responsive to a particular caller inquiry suitable for use by a bank, brokerage house, public utility or other system provider. Each pre-recorded speech element may be of any desired length. For each system implementation, an opening fragment "length" is selected (e.g., the first 4 or 8 kilobytes of each speech element). Then, for each speech element the first 4 kilobytes, for example, of digital data representative of that speech element is stored in memory 22. One half second of audio may typically be represented by 4 kilobytes of digital data. Correspondingly, the remainder of each speech element is stored in speech storage facility 30. Then, when controller 20 determines that a particular speech element (e.g., speech element No. 4,321, of 6,000 pre-recorded speech elements) should be played to a caller, the opening 4 kilobyte fragment of speech element No. 4,321 is retrieved and played from memory 22. Contemporaneously, the remaining portion of speech element No. 4,321 is retrieved from storage 30, placed in memory 22, and by concatenation techniques made to smoothly follow the opening fragment in providing a complete version of speech element No. 4,321 to the caller. Where a response to a caller is to be assembled from a plurality of pre-recorded speech elements (e.g., from individual numbers, words or phrases, or combinations thereof) intra-message latent periods or "dead air" gaps are similarly avoided by rapid openings using opening fragments from active computer memory, followed by concatenated remaining portions, for a succession of speech elements retrieved from a speech storage facility. Where a very short speech element is involved, the opening fragment may comprise the entire speech element with no associated remaining portion. More generally, however, a speech element will typically be long enough so that both an opening fragment and a remaining portion will be involved.

Figure 2:
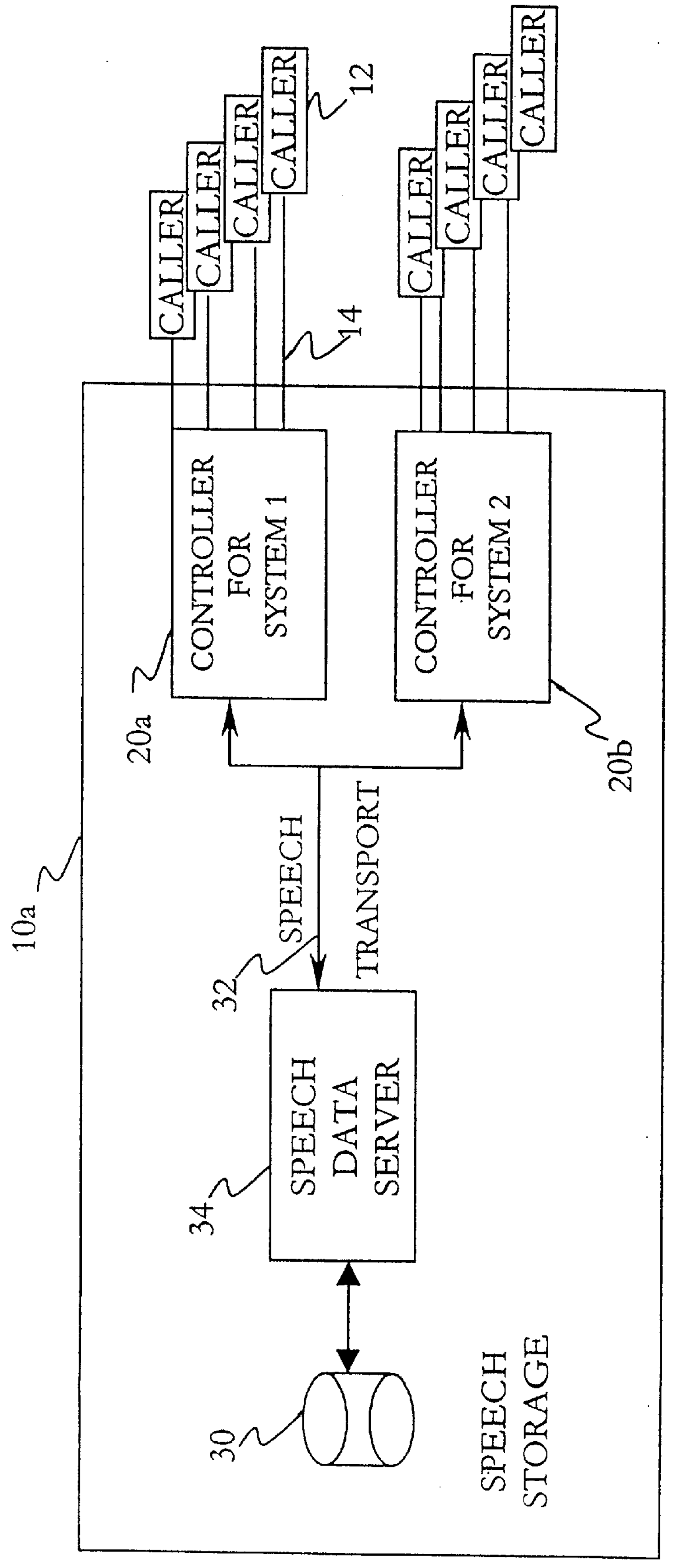
FIG. 2 shows a multi-unit configuration, utilizing a common speech data server and speech storage facility, in accordance with the invention.

Referring now to FIG. 2, there is illustrated a speech playback system 10*a*, which includes two controllers 20*a* and 20*b*, are shown coupled to speech storage facility 30 via speech transport 32 (e.g., a LAN) and speech data server 34. Controllers 20*a* and 20*b* may each be a unit as described with reference to controller 20 of FIG. 1. There are thus effectively two systems (systems 1 and 2) with shared speech storage facilities. In this configuration, a larger volume of activity is enabled by inclusion of speech data server 34, which is a computer-based system based on known techniques to supply recorded speech data to a plurality of controllers.

Figure 3:
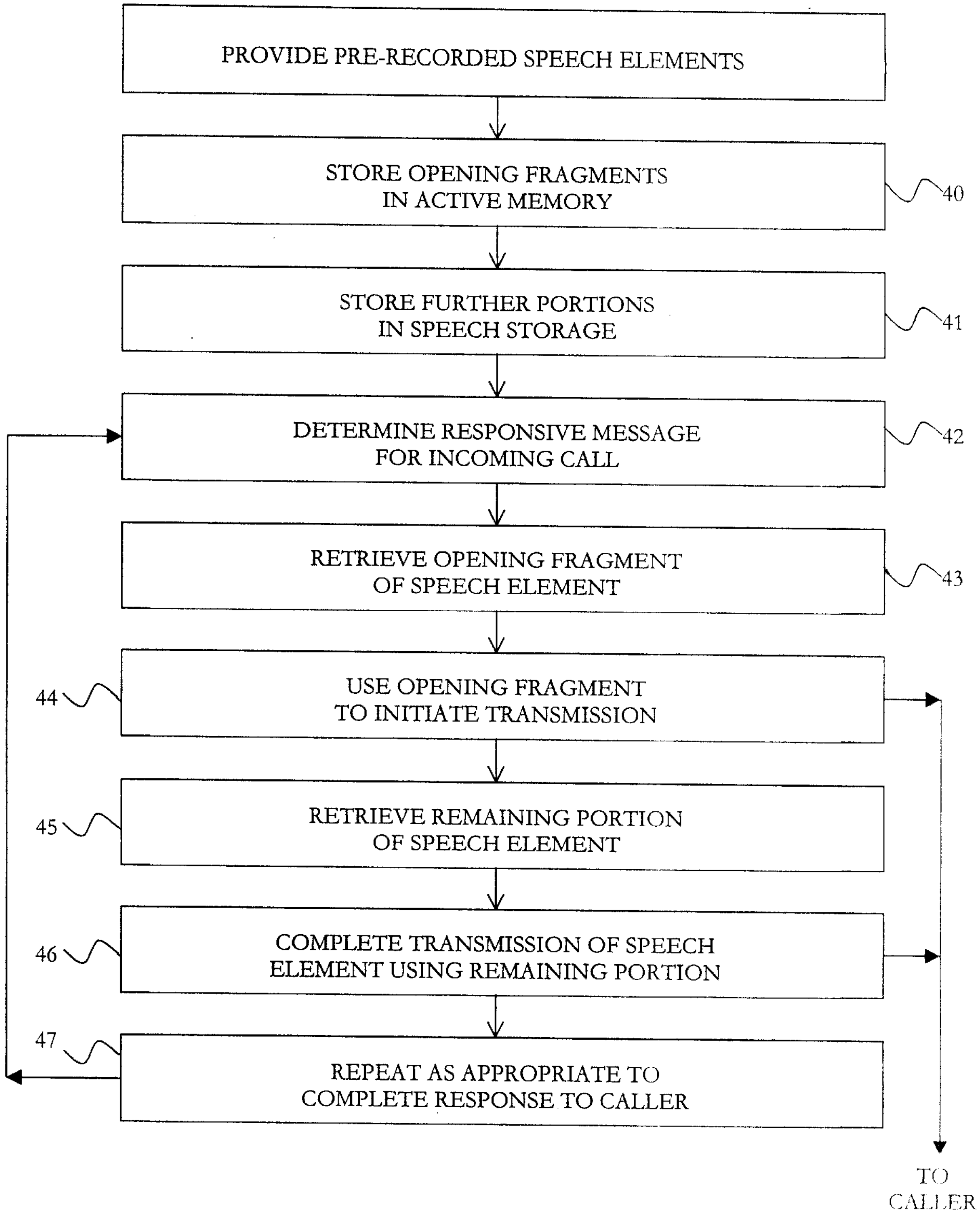
FIG. 3 is a flow chart useful in describing a speech playback method pursuant to the invention.

Operational understanding of the invention will be enhanced by consideration of a speech playback method pursuant to the invention. An exemplary method as illustrated in FIG. 3 includes the following steps. Initially, a collection of pre-recorded speech elements suitable for responding to incoming calls in a particular application (e.g., response to brokerage customers) is provided. Such collection may include a large number of sentences, phrases, words and spoken numbers usable to form appropriate responses by use of concatenation techniques.

At 40, opening fragments of speech elements are stored in memory 22 of FIG. 1, to permit rapid access to such fragments. A fragment for this purpose may comprise the first 4 or 8 kilobytes of digital data representing a speech element. In some applications, the length of the opening fragments stored in memory 22 may not be uniform. For example, short words or individual numerical digits may be treated as opening fragments and stored in their entirety in active computer memory 22.

At 41, remaining portions of speech elements are stored in speech storage facility 30. For example, if a speech element is a sentence and the first 4 kilobytes of recorded speech data has been stored in memory 22, the speech data for the remainder of the sentence is stored in storage 30. As will be appreciated, memory 22 provides rapid retrieval access, while storage 30 provides retrieval access which is slower than the rapid retrieval access of memory 22.

At 42, controller 20 determines the appropriate make-up of a message which will be responsive to an incoming call. By application of appropriate software in known manner, controller 20 utilizes whatever associated caller data is available relative to a particular incoming call to determine the content of a responsive message.

At 43, controller 20 causes an appropriate opening fragment of a speech element, to be used in providing the responsive message, to be retrieved from memory 22.

At 44, controller 20 initiates action to transmit to the caller a message beginning with the retrieved opening fragment.

At 45, controller 20 causes the remaining portion of the speech element to be retrieved from storage 30.

At 46, controller 20 causes transmission of the message to the caller to be continued with the retrieved remaining portion by use of concatenation techniques, to provide a composite message intelligible to the caller. In providing the message to the caller, retrieved speech data in digital form is converted into audio signals via speech playback unit 24.

At 47, steps 42 through 46 are repeated as appropriate to respond to further inquiries from the caller.

It should be understood that the above steps are not necessarily executed strictly in order. For example, retrieval of the remaining portion may be initiated before or concurrently with action to transmit the opening fragment. In any event, it is normally an objective that, as transmission of the opening fragment is completed, the speech data for the remaining portion is available for use in providing what will be perceived by the caller as a continuous speech element.

Each responsive message may comprise one or a plurality of speech elements. In the case of a plurality, as the transmission of the first speech element is completed, the process of opening fragment and remaining portion retrieval for the next speech element can be implemented, so that extensive messages can be provided with reduction of both initial and intra-message latent periods.

While there have been described the currently preferred embodiments of the invention, those skilled in the art will recognize that other and further modifications may be made without departing from the invention and it is intended to claim all modifications and variations as fall within the scope of the invention.

What is claimed is:

1. A speech playback system, using concatenation with rapid opening to respond to an incoming call from a caller, comprising:

memory to store opening fragments of speech elements and permit rapid retrieval access thereto;

storage to store remaining portions of speech elements and permit retrieval access thereto which is slower than said rapid retrieval access; and a controller responsive to said incoming call (i) to determine a responsive message, (ii) to cause an opening fragment of a speech element to be retrieved from said memory, (iii) to cause a remaining portion of said speech element to be retrieved from said storage, and (iv) to cause a message beginning with said opening fragment and continuing with said remaining portion to be provided to said caller.

2. A speech playback system as in claim 1, wherein said memory is a solid state computer memory.

3. A speech playback system as in claim 1, wherein said storage includes an electromagnetic medium speech storage unit controlled by a speech data server.

4. A speech playback system as in claim 1, wherein said controller is a computer utilizing suitable computer programs.

5. A speech playback system as in claim 1, additionally comprising:

a speech playback unit arranged to convert retrieved opening fragments and remaining portions of speech elements into audio signals for transmission to the caller.

6. A speech playback system as in claim 5, additionally including a speech transport arranged to couple remaining portions of speech elements retrieved from the speech storage unit to the speech playback unit.

7. A speech playback system as in claim 1, wherein the controller is arranged in clause (iii) to cause said remaining portion after retrieval from said storage to be temporarily stored in said memory, prior to causing the message to be provided to said caller.

8. A speech playback method, using concatenation with rapid opening to respond to an incoming call from a caller, comprising the steps of:

(a) storing opening fragments of speech elements to permit rapid retrieval access thereto;

(b) storing remaining portions of speech elements to permit retrieval access thereto which is slower than said rapid retrieval access;

(c) determining a responsive message in response to said incoming call;

(d) retrieving an opening fragment stored in step (a);

(e) initiating action to transmit to said caller a message beginning with said opening fragment retrieved in step (d);

(f) retrieving a remaining portion stored in step (b); and (g) continuing transmission to said caller of the message initiated in step (e) by transmission of said remaining portion retrieved in step (f).

9. A method as in claim 8, wherein steps (e) and (g) respectively include converting retrieved opening fragments and remaining portions into audio signals for transmission to the caller.

10. A method as in claim 8, wherein step (a) includes storing opening segments in a solid state computer memory.

11. A method as in claim 10, wherein step (b) includes storing said remaining portions in a speech storage facility separate from the memory utilized in step (a).

12. A method as in claim 8, wherein step (a) includes storage in a solid state computer memory and step (f) includes temporarily storing said remaining portion in said computer memory prior to its transmission to said caller in step (g).

13. A speech playback method, using concatenation with rapid opening to respond to an incoming call from a caller, comprising the steps of:

(a) storing opening fragments of speech elements to permit rapid retrieval access thereto;

(b) storing remaining portions of speech elements to permit retrieval access thereto which is slower than said rapid retrieval access;

(c) determining a responsive message in response to said incoming call;

(d) retrieving an opening fragment stored in step (a);

(e) retrieving a remaining portion stored in step (b); and (f) transmitting to said caller a message beginning with said opening fragment retrieved in step (d) and continuing with said remaining portion retrieved in step (e).

14. A method as in claim 13, wherein step (f) includes converting retrieved opening fragments and remaining portions into audio signals for transmission to the caller.

15. A method as in claim 13, wherein step (a) includes storing opening fragments in a solid state computer memory.

16. A method as in claim 15, wherein step (b) includes storing said remaining portions in a speech storage facility separate from the memory utilized in step (a).

17. A method as in claim 13, wherein step (a) includes storage in a solid state computer memory and step (e) includes temporarily storing said remaining portion in said computer memory prior to its transmittal to said caller in step (f).

* * * * *